J. K. WOOLSLAIR & G. A. ARNDT.
FRUIT WASHING AND POLISHING MACHINE.
APPLICATION FILED DEC. 24, 1909.
988,529.
Patented Apr. 4, 1911.
3 SHEETS—SHEET 3.
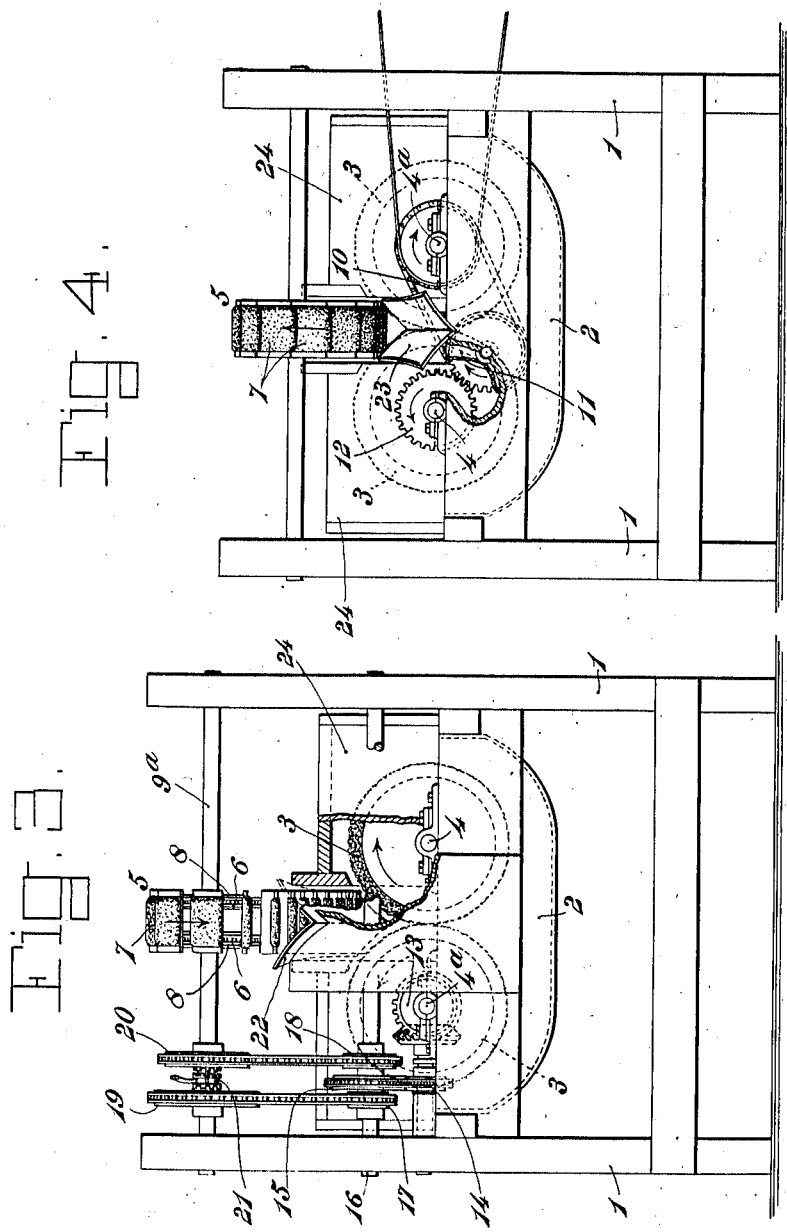

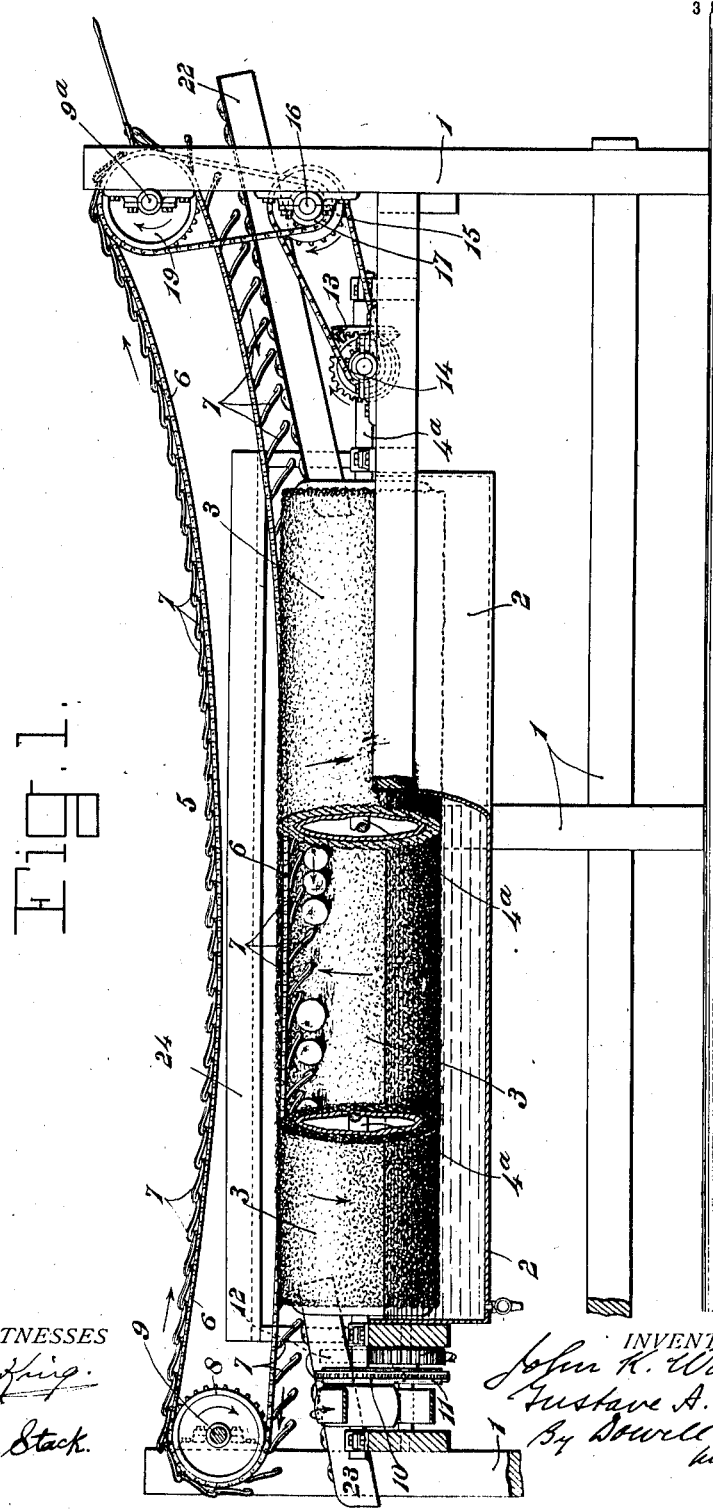

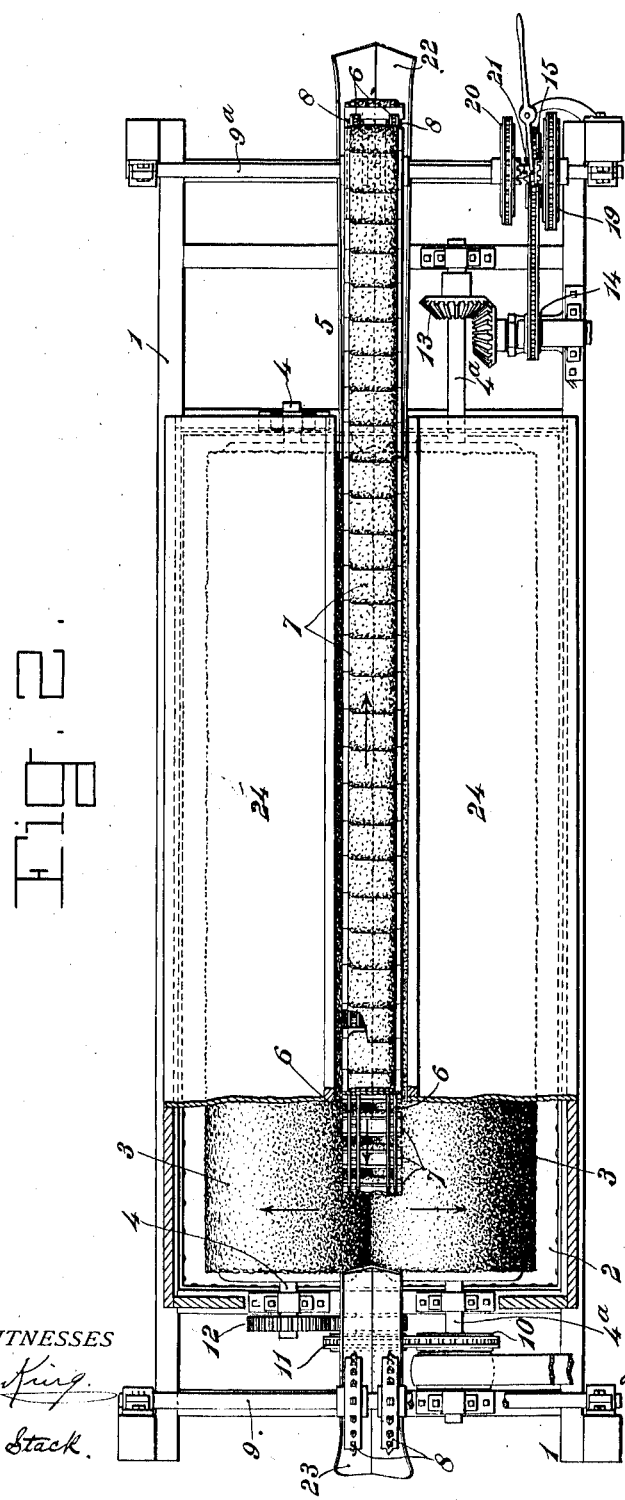

UNITED STATES PATENT OFFICE.

JOHN K. WOOLSLAIR AND GUSTAVE A. ARNDT, OF LEE COUNTY, FLORIDA.

FRUIT WASHING AND POLISHING MACHINE.

988,529. Specification of Letters Patent. Patented Apr. 4, 1911.

Application filed December 24, 1909. Serial No. 534,889.

*To all whom it may concern:*

Be it known that we, JOHN K. WOOLSLAIR and GUSTAVE A. ARNDT, citizens of the United States, residing in the county of Lee and State of Florida, have invented certain new and useful Improvements in Fruit Washing and Polishing Machines, of which the following is a specification.

The object of the invention is to provide a machine in which fruit is washed and polished between revolving cylinders or rollers.

The invention will first be described with reference to the accompanying drawings and then more particularly pointed out in the appended claims.

Referring to the drawings: Figure 1 is a side elevation, partly in section, of a machine embodying the invention. Fig. 2 is a plan view, partly in section, of the machine shown in Fig. 1. Fig. 3 is an elevation, partly in section of one end of the machine. Fig. 4 is a similar view of the other end of the machine.

1 denotes the frame of the machine; and 2 a tank supported by the frame and containing a cleansing fluid, as water, or a prepared liquid.

3—3 denote a pair of approximately horizontal, oppositely rotating, brushing cylinders placed side by side in close relation to each other and longitudinally of the machine and with the lower portions of their convex surfaces dipping into the cleansing fluid contained in tank 2. The convex surfaces of these cylinders are covered with a soft, fibrous or filamentous material, such, for example as sheep's wool; and the cylinders 3 are carried by shafts 4—4ª which are rotatably mounted in a suitable manner on the frame of the machine.

The brushing cylinders revolve upwardly, away from each other; and in the V-shaped trough formed by them above their centers, the fruit to be cleaned is tumbled between them and is brushed and washed and polished by their moistened surfaces.

The fruit is carried along the length of the cylinders 3 by means of a drag-belt 5 that travels along the V-shaped trough formed by the rollers. The drag belt shown is formed of a pair of continuous sprocket chains 6—6 arranged parallel to and near each other and from and between which are hung pads 7 of soft material, such for example as rubber, felt or carpet. These pads, as they are carried along by the chain belt, wipe against and rub over the fruit and roll it along the length of the cylinders 3 and discharge it from between them. Each sprocket chain 6 runs over oppositely disposed sprocket wheels 8 fast upon shafts 9, 9ª suitably mounted on the frame 1 at opposite ends of the machine.

Power to drive the machine may be applied to the shaft 4ª, of one of the brushing cylinders, by means of a belt-driven pulley fast to said shaft; and from this shaft 4ª motion may be transmitted throughout the machine by the means illustrated, in which 10 denotes a sprocket wheel fast on the driven shaft 4ª and driving, by means of a sprocket chain, a sprocket wheel 11 fast on a shaft revolubly mounted upon the frame 1, to which shaft is also fast a spur gear that is in mesh with a gear 12 on the shaft 4 of the other brushing cylinder. Fast to the shaft 4ª, at the other side of the cylinder from the belt driven pulley, is a bevel gear 13 which is in mesh with a similar gear that is fast to a stub shaft revolubly mounted in a suitable manner on the frame 1; and said stub shaft has also fast thereto a sprocket wheel 14 which is connected by a sprocket chain to a sprocket wheel 15 fast on a shaft 16 revolubly mounted on the frame of the machine.

The shaft 16 has a changeable speed connection with the shaft 9ª to which the pair of sprocket wheels which drive the chains 6—6 of the drag-belt 5 are fast. The changeable speed connection shown comprises two sprocket wheels 17, 18 fast to the shaft 16 and connected by sprocket chains to sprocket wheels 19, 20 respectively, loose upon the shaft 9ª, and provided with opposed clutch-faced hubs, either of which is adapted to be engaged by a clutch-sleeve 21 having its opposed ends formed to engage the adjacent clutch-faced hubs. The clutch-sleeve 21 is feathered to the shaft 9ª, to rotate therewith, but to be slidable thereon between said hubs in the usual and well known manner. As the ratio between the diameters of the gears 17 and 19 differs from the ratio of the diameter of the gear 18 to 20, it will be seen that the speed of the drag belt can be varied by disengaging the clutch sleeve from either of the gears 19 or 20 and engaging it with the other gear. The clutch-sleeve 21 may be shifted by a lever pivoted to the machine and provided with a yoke which rests in an annular groove of the clutch-sleeve.

22 denotes a chute by means of which the fruit is fed in between the rollers 3; and 23 denotes a chute which receives and discharges the fruit after it has been carried along the length of the rollers.

The tank 2 and roller 3 may be provided with an upper inclosing casing 24 through which is provided a passageway for the drag belt 5. The tank 2 may also be provided with a faucet as shown to draw off the contents of the tank.

The fruit to be cleaned and polished, oranges for example, are fed into the chute 22 which discharges them into the V-shaped trough between the brushing cylinders, which rotating upwardly away from each other rubs and rolls the oranges between their moistened fibrous surfaces; and the pads of the drag-belt being drawn along this trough between the cylinders strikes against the oranges and rolls them lengthwise of the rollers thereby constantly changing their position with reference to the cylinders 3 so that all portions of the oranges are exposed to the scouring action of the cylinders.

It will be seen that the machine is simple in construction and operation and that it will clean and polish the fruit thoroughly and expeditiously.

Having described our invention, what we claim, is—

1. A fruit cleaning machine comprising a pair of rotatable brushing cylinders having a filamentous or fibrous covering, the cylinders being disposed side by side to form a trough-like space in which the fruit is supported and rolled by the cylinders, and a drag-belt movable along said trough-like space above and adapted to contact with the fruit therein to roll said fruit lengthwise of the cylinders.

2. A fruit cleaning machine comprising a frame, a pair of horizontally disposed brushing cylinders, rotatable shafts journaled in the frame, each shaft carrying a brushing cylinder fast thereto, a shaft rotatably mounted on the frame at each end of the cylinders and transversely thereof, a continuous drag-belt running on said transverse shafts and driven by one of them, the bottom stretch of the belt running in the space between the upper portions of the cylinders and adapted to contact with and roll along the fruit contained in said space, means for applying power to the shaft of one of the cylinders to rotate it, gearing connecting the shafts of both cylinders to have them rotate oppositely, and variable speed driving connections between the shaft of one of the brushing cylinders and the transverse shaft that drives the drag-belt.

3. In a fruit cleaning machine, the combination with a pair of cylinders adapted to brush fruit placed between them, of means for moving the fruit along said cylinders, said fruit moving means comprising a pair of continuous sprocket chains disposed parallel to each other and brushing pads connected thereto to hang downwardly from the sprocket chains into the space between the cylinders to contact with the fruit and roll it along.

4. In a fruit cleaning machine, the combination with a pair of rotating cylinders disposed approximately horizontal and having a filamentous or fibrous covering for their convex surfaces, the cylinders being disposed side by side to sustain the fruit between them, means for rolling the fruit lengthwise of the cylinders, such means comprising an endless belt having pads hung therefrom and adapted to contact with and rub over the fruit and roll it along the cylinders, said hanging of the pads permitting them to be swung upwardly by the fruit in passing thereover.

In testimony whereof we affix our signatures in presence of two witnesses.

JOHN K. WOOLSLAIR.
GUSTAVE A. ARNDT.

Witnesses:
HARRY M. KREAMER,
LOIS S. KREAMER.